(No Model.)
C. M. RIDER.
BICYCLE SUPPORT.
No. 497,549. Patented May 16, 1893.
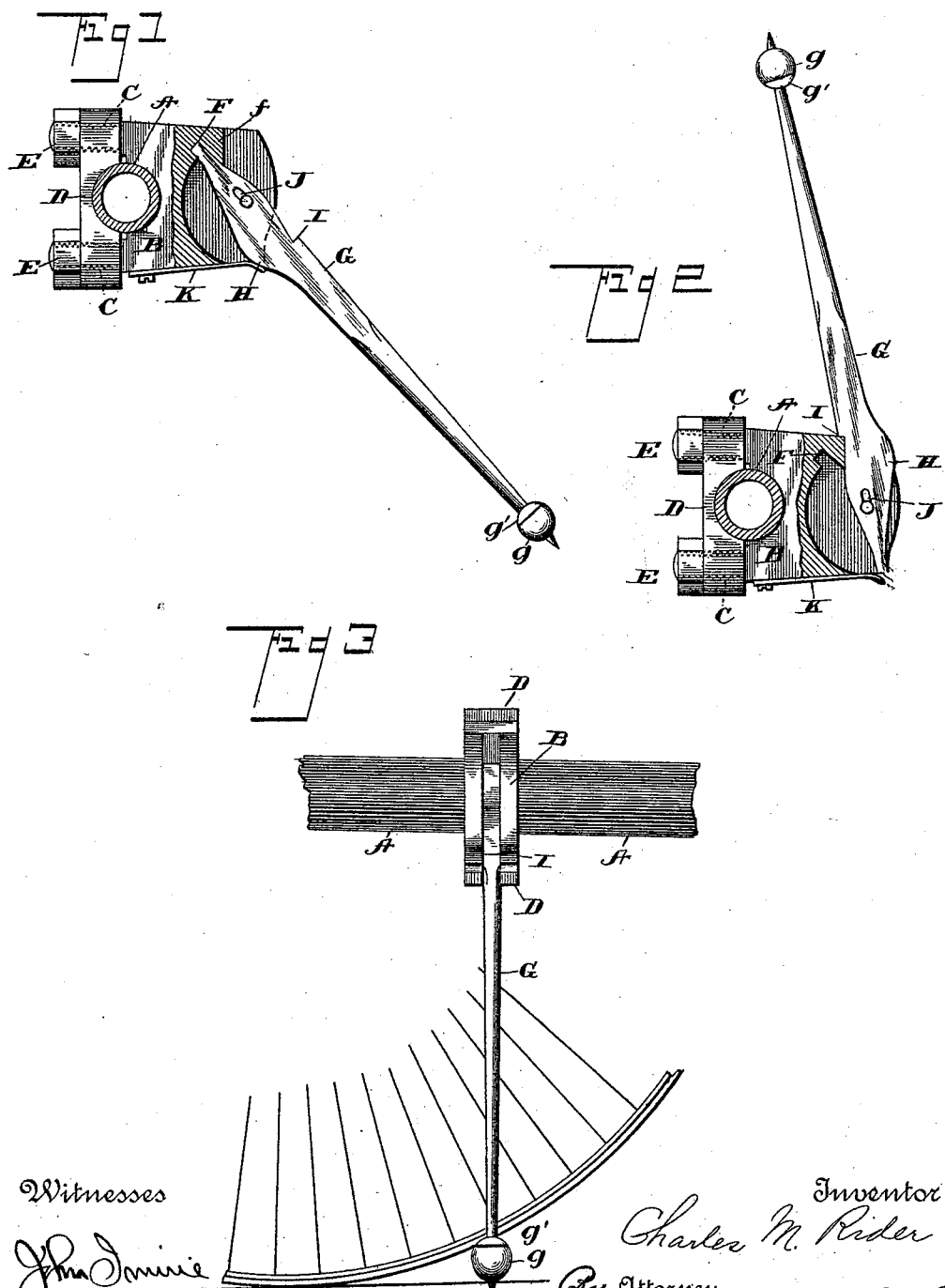

UNITED STATES PATENT OFFICE.

CHARLES M. RIDER, OF NEWARK, OHIO.

BICYCLE-SUPPORT.

SPECIFICATION forming part of Letters Patent No. 497,549, dated May 16, 1893.

Application filed May 4, 1892. Serial No. 431,780. (No model.)

*To all whom it may concern:*

Be it known that I, CHARLES M. RIDER, a citizen of the United States, residing at Newark, in the county of Licking and State of Ohio, have invented certain new and useful Improvements in Bicycle-Supports; and I do hereby declare the following to be a full, clear, and exact description of the invention, such as will enable others skilled in the art to which it appertains to make and use the same.

My invention relates to certain new and useful improvements in bicycle supports and has for its object to provide a support, which may be turned up in such manner as to clear the ground and all ordinary obstructions while the bicycle is being employed for purposes of locomotion, but which may be turned down in such manner as to rest upon the ground and support the bicycle in an upright position when the same is not in use, and it consists in a support constructed and arranged substantially in the manner hereinafter fully described and afterward definitely pointed out in the claims, due reference being had to the accompanying drawings forming a part of this specification, wherein—

Figure 1 is a side elevation partly in section of the bracket and rod, the rod being shown turned up in position to support the bicycle and one side of the bracket removed; Fig. 2 a similar view showing the rod turned up, and Fig. 3 a front elevation of the bracket and rod, the rod being shown turned down.

Referring to the drawings the letter A indicates one part of the frame of a bicycle. To the said side bar A of the frame is secured a bracket B concave upon its inner side to conform to the rounded surface of the side bar A of the frame to which it is secured by means of threaded extensions C, C, which embrace or straddle the side bar and are secured thereon by a clip plate D held in place on said threaded extensions C, C, by nuts E, E. The bracket is bifurcated or slotted as shown and is provided with a recess F inclined at an angle corresponding to the angle which it is intended the supporting rod shall assume when in a position to hold the machine in an upright position. Immediately above said recess is a projecting lip $f$, for the purpose hereinafter described. Within the bracket B is pivoted a rod G, pointed at its lower end and provided with a pad $g$, of rubber or other suitable material. The pointed end of the rod slightly projects beyond the pad $g$, and a washer $g'$ encircles the rod in the rear of the pad to maintain the latter in position. The upper end of the rod G is tapered or reduced in order that it may fit within the recess F and upon its one side near its pivoted point is provided with a cam shaped projection H and upon its other side is notched to form a shoulder I, for the purpose hereinafter described. At the point where the rod is pivoted within the bracket it is provided with an elongated slot J through which the pivot passes. When the rod is turned down in position to support the bicycle its upper end enters the recess F, the slot J permitting sufficient vertical movement for the purpose, the lip $f$ preventing the end of the rod from passing the recess and insuring its seating itself therein. To the under side of the bracket is secured by means of a screw or otherwise a flat spring K, the free end of which beneath the bifurcated or stalled portion of the bracket is adapted to be engaged by the projection H as will hereinafter appear.

The operation of my device will be readily understood from the foregoing description. Before mounting the bicycle the rider pushes the rod slightly downward to cause its end G to disengage the recess F and then turns the rod up about its pivot until the end engages the free end of the spring K and the shoulder I of the rod rests upon the top edge of the bracket. The rod will be firmly held in this position entirely out of the way and the spring K will also save to prevent rattling of the rod within the bracket. After dismounting the rider turns the rod down about its pivot the end of the rod disengaging the spring K and when it strikes against the lip $f$ the end of the spring K bears against the under side of the projection H and lifts or forces the rod up, the end thereof entering the recess F and thus locking the rod in position. The bicycle is then inclined to one side until the lower end of the rod rests upon the ground.

Instead of securing the bracket to the side bar of the frame by means of the clip shown, it may be secured thereto in other suitable manner.

Having described my invention, what I claim is—

1. In a bicycle support, the combination with the bifurcated bracket B having a recess F, of a rod G provided with an elongated slot J and a pivot pin in said bracket passing through said slot, the end of said rod being adapted to be seated in said recess to lock the rod in place, substantially as described.

2. In a bicycle support, the combination with the bifurcated bracket B having a recess F, of a rod G provided with an elongated slot J, a pivot pin in said bracket passing through said slot, a spring K secured to the under side of said bracket, and a projection H upon one side of said rod adapted to engage said spring, substantially as described and for the purpose specified.

3. In a bicycle support, the combination with the bifurcated bracket B, having a recess F, and a projecting lip $f$ disposed above said recess, of a rod G provided with an elongated slot J, a pivot pin in said bracket passing through said slot, a spring K secured to the under side of said bracket, and a projection H upon one side of said rod adapted to engage said spring, substantially as shown and described and for the purpose specified.

In testimony whereof I affix my signature in presence of two witnesses.

CHARLES M. RIDER.

Witnesses:
HARRY J. HOOVER,
EDSON B. DENNIS.